Patented Apr. 29, 1947

2,419,888

UNITED STATES PATENT OFFICE 2,419,888

SEED AND PLANT DISINFECTANTS

Kenneth G. Nolan and Ingenuin Hechenbleikner, Stamford, Conn., assignors to American Cyanamid Company, New York, N. Y., a corporation of Maine No Drawing. Application December 4, 1943, Serial No. 512,972

6 Claims. (Cl. 167—38)

The present invention relates to a method of controlling diseases of seeds and plants, and more particularly to a class of organic compounds which are highly effective for the control of diseases of seed grain.

These new disinfectants comprise the bromoacetamides represented by the general formula:

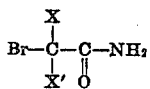

in which X and X' are chosen from the group consisting of hydrogen, cyanogen, thiocyanogen and halogen.

As showing the wide diversity of compounds which may be used for the purposes of this invention, the following may be mentioned: tribromoacetamide, chlorodibromoacetamide, cyanodibromoacetamide, dibromoacetamide, chlorobromoacetamide, cyanobromoacetamide, thiocyanobromoacetamide, cyanochlorobromoacetamide, bromoacetamide, bromoiodoacetamide, fluorodibromoacetamide, thiocyanodibromoacetamide, fluorobromoacetamide, fluorochlorobromoacetamide, cyanofluorobromoacetamide, thiocyanofluorobromoacetamide, dibromoiodoacetamide and dicyanobromoacetamide.

These compounds possess high fungicidal power and have been found particularly effective in protecting seeds and seedlings from seed-borne and soil-borne organisms which cause seed rot, seedling blight and damping-off. Compounds such as, for example, chlorodibromoacetamide, tribromoacetamide and cyanodibromoacetamide are especially effective in controlling such systemic organisms as bunt of wheat and smut of oats.

The compounds may also be used for the protection of plants against fungous organisms which cause defoliation, blight, mildew, fruit rot, fruit spots and the like.

The effectiveness of the bromoacetamides in controlling Diplodia root rot of corn is illustrated by the results given in Table 1. Diplodia infected corn seeds were treated with bromoacetamide dusts (equal parts of disinfectant and talc), and planted in field plots. The per cent emergence or stand of corn seedlings and the per cent healthy plants produced in the plots were recorded.

Table 1

| Disinfectant | Ounces of dust per bushel of seed | Per cent emergence or stand | Per cent healthy plants |
|---|---|---|---|
| None (untreated seed) | | 65.0 | 35.0 |
| Cyanodibromoacetamide | 2 | 89.0 | 85.0 |
| Chlorodibromoacetamide | 1.5 | 93.6 | 74.2 |
| Tribromoacetamide | 1.5 | 93.3 | 80.9 |

Federation wheat artificially inoculated with bunt spores was treated with dusts containing the bromoacetamides, and planted in field plots. The disinfectants were applied in the proportion of one ounce of dust (equal parts of the bromoacetamide and talc) per bushel of seed. Table 2 gives the per cent of smutted heads of wheat resulting from both treated and untreated seeds.

Table 2

| Disinfectant | Per cent Smutted Heads |
|---|---|
| None (untreated seed) | 20.94 |
| Chlorodibromoacetamide | 0.11 |
| Tribromoacetamide | 0.34 |

A dust comprising equal parts of cyanodibromoacetamide and talc was applied to Ceres wheat artificially inoculated with bunt spores in the proportion of 2 ounces of dust per bushel of seed. The seeds were sown in the field and the wheat heads examined for smut. The wheat seed disinfected with the cyanodibromoacetamide produced no smutted heads whereas the untreated seed gave 48.2% smutted heads.

Dusts consisting of equal parts of chlorodibromoacetamide and talc, and equal parts of tribromoacetamide and talc were found well adapted for the treatment of Anthony oat seed artificially inoculated with covered smut in the proportion of 2 ounces of dust per bushel of grain.

The bromoacetamides of this invention may also be found useful for the control of Gibberella seedling blight of corn, Gibberella and Helminthosporium blights of small grains, covered smut of barley and damping-off diseases caused by Pythium, Rhizoctonia and Fusaria.

Although the above compounds may be used alone as seed and plant disinfectants, it is usually preferable to mix them with inert fillers or spreading materials such as talc, bentonite, fuller's earth, pumice, silica, silicates, chalk, and the like. The proportion of the disinfectant to the inert material in the prepared dust may be varied in accordance with the particular effects desired and the conditions under which it is to be used. Under some circumstances it may be desirable and feasible to apply the present compounds in the form of solutions or suspensions in liquids, and the present invention does not preclude such use.

In the claims, the treatment of "plants" is intended to also cover the treatment of seeds.

While the invention has been described with particular reference to specific embodiments, it is to be understood that it is not to be limited thereto but is to be construed broadly and restricted solely by the scope of the appended claims.

We claim:

1. A method of controlling diseases of plants which includes treating them with a toxic quantity of a bromoacetamide of the formula:

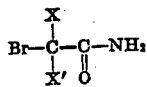

in which X and X' are chosen from the group consisting of hydrogen, cyanogen, thiocyanogen and halogen.

2. A method of controlling diseases of plants which includes treating them with a toxic quantity of cyanodibromoacetamide.

3. A method of controlling diseases of plants which includes treating them with a toxic quantity of tribromoacetamide.

4. A method of controlling diseases of plants which includes treating them with a toxic quantity of chlorodibromoacetamide.

5. A composition for the control of seed and plant diseases comprising a toxic amount of a compound of the formula:

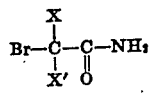

in which X and X' are chosen from the group consisting of hydrogen, cyanogen, thiocyanogen and halogen, and a solid inert filler.

6. A composition for disinfecting seeds comprising substantially equal parts of a bromoacetamide of the formula:

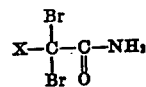

in which X represents a member of the group consisting of cyanogen, chlorine and bromine, and a solid inert filler.

KENNETH G. NOLAN.
INGENUIN HECHENBLEIKNER.

REFERENCES CITED

The following references are of record in the file of this patent:

Giacalone et al., Chemical Abstracts, vol. 29, page 5414.